(12) United States Patent
Wu et al.

(10) Patent No.: US 11,494,298 B2
(45) Date of Patent: *Nov. 8, 2022

(54) ONE-TIME PROGRAMMABLE MEMORY DEVICE AND FAULT TOLERANCE METHOD THEREOF

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 120 days.

This patent is subject to a terminal disclaimer.

(21) Appl. No.: 17/061,418

(22) Filed: Oct. 1, 2020

(65) Prior Publication Data

US 2021/0200671 A1 Jul. 1, 2021

(30) Foreign Application Priority Data

Dec. 26, 2019 (TW) ................................ 108147740

(51) Int. Cl.
*G06F 12/02* (2006.01)
*G06F 12/06* (2006.01)
(Continued)

(52) U.S. Cl.
CPC ...... *G06F 12/0246* (2013.01); *G06F 11/3037* (2013.01); *G06F 12/0646* (2013.01); *G06F 13/1668* (2013.01); *G06F 2212/2142* (2013.01)

(58) Field of Classification Search
CPC ......... G06F 2206/1014; G06F 12/0246; G06F 3/0679; G06F 12/0238; G06F 2212/2142;
(Continued)

(56) References Cited

U.S. PATENT DOCUMENTS 8,174,863 B1 5/2012 Krishnamoorthy et al.
8,472,233 B1 6/2013 Krishnamoorthy et al.
(Continued)

OTHER PUBLICATIONS

A Comparative Study of Categorical Variable Encoding Techniques for Neural Network Classifiers by Potdar (Year: 2017).*
(Continued)

*Primary Examiner* — Paul M Knight
(74) *Attorney, Agent, or Firm* — Muncy, Geissler, Olds & Lowe, P.C.

(57) ABSTRACT

A one-time programmable memory device is provided in the invention. The one-time programmable memory device includes a one-time programmable memory and a memory controller. The one-time programmable memory includes a first block, a second block and a third block. The first block includes a plurality of initial-address-unit groups and each initial-address-unit group includes a plurality of initial address units and each initial address unit corresponds to a variable to record the storage address of its corresponding variable. The second block includes a plurality of initial address control units and each initial address control unit corresponds to one of the variables to record the corresponding initial-address-unit group of each variable. The third block includes a plurality of storage units and each storage unit has a corresponding storage address. The memory controller is configured to assign the storage addresses to the variables.

20 Claims, 8 Drawing Sheets

(51) Int. Cl.
*G06F 11/30* (2006.01)
*G06F 13/16* (2006.01)

(58) Field of Classification Search
CPC ............. G06F 11/3037; G06F 12/0646; G06F 13/1668
See application file for complete search history.

(56) References Cited

U.S. PATENT DOCUMENTS

| | | | |
|---|---|---|---|
| 9,824,768 B2 * | 11/2017 | Chung | G11C 17/165 |
| 10,409,714 B1 * | 9/2019 | Shah | G06F 12/0607 |
| 11,281,981 B2 * | 3/2022 | Sharon | G06F 3/0611 |
| 2012/0280711 A1 | 11/2012 | Landry | |
| 2015/0294196 A1 | 10/2015 | Toyoda | |
| 2016/0232044 A1 * | 8/2016 | Doyle | G06F 9/466 |
| 2018/0024830 A1 | 1/2018 | Kannan | |
| 2019/0317778 A1 | 10/2019 | Chen | |
| 2020/0319876 A1 | 10/2020 | Colombo | |
| 2020/0393991 A1 * | 12/2020 | Kachare | G06F 3/0656 |
| 2021/0182219 A1 * | 6/2021 | Benisty | G06F 3/0604 |

OTHER PUBLICATIONS

Why One-Hot Encode Data in Machine Learning? by Brownlee (Year: 2017).*
VLSIBlogspot One Hot Encoding (Year: 2008).*
Office Action and Search Report issued in U.S. Appl. No. 17/061,216 dated Oct. 21, 2021, 14 pages.

* cited by examiner

ONE-TIME PROGRAMMABLE MEMORY DEVICE AND FAULT TOLERANCE METHOD THEREOF

CROSS REFERENCE TO RELATED APPLICATIONS

This application claims priority of TW Patent Application No. 108147740 filed on Dec. 26, 2019, the entirety of which is incorporated by reference herein.

BACKGROUND OF THE INVENTION

Field of the Invention

The invention generally relates to a one-time programmable memory technology, and more particularly, to the one-time programmable memory in which the initial address units and the initial address control units are configured.

Description of the Related Art

The one-time programmable memory is a general data storage space. It is notable in that the memory only tolerates one-time programming and the programmed data cannot be erased or changed. The irreversibility of the one-time programmable memory for the data programming can make things difficult in situations where the user wants to modify the data. Therefore, a fault tolerance mechanism is introduced into the one-time programmable memory to allow the contents of variables in the programmed data to be modified.

For the fault tolerance mechanism, the simplest realized method is the fault tolerance mechanism is performed based on the version. In the fault tolerance mechanism based on the version, a plurality of spaces of the same size will be allocated according to the limitation on how many times the data can be modified. Each space can be regarded as a version, and is assigned a specific version number. In the fault tolerance mechanism based on the version, a variable "executed version number" is provided to tell the controller which version number is currently being used. When the user wants to modify the contents of the variables, the new contents of the variables will be programmed into the new version, and the executed version number will be changed to the version number of new version. However, in the fault tolerance mechanism based on the version, when a variable needs to be modified, the storage space of the original version in which other accurate variables are stored will be abandoned. For example, when the content of a variable in version 1 needs to be modified, the contents of all variables in version 1 will need to be programmed into the storage space of new version (e.g. version 2), and the storage space of the version 1 will be abandoned. Therefore, although the fault tolerance mechanism based on the version is simple and realized easily, a lot of storage space is wasted.

BRIEF SUMMARY OF THE INVENTION

A one-time programmable memory device and a tolerance method for the one-time programmable memory are provided to overcome the problems described above.

An embodiment of the invention provides a one-time programmable memory device. The one-time programmable memory device comprises a one-time programmable memory and a memory controller. The one-time programmable memory comprises a first block, a second block and a third block. The memory controller is coupled to the one-time programmable memory and controls the first block, the second block and the third block. The first block comprises a plurality of initial-address-unit groups and each initial-address-unit group comprises a plurality of initial address units and each initial address unit corresponds to a variable to record the storage address of its corresponding variable. The second block comprises a plurality of initial address control units and each initial address control unit corresponds to one of the variables to record the corresponding initial-address-unit group of each variable. The third block comprises a plurality of storage units and each storage unit has a corresponding storage address, and the memory controller is configured to assign the storage addresses to the variables. The content of each variable is stored in the storage unit corresponding to the storage address corresponding to the variable. The number of variables is smaller than the number of storage units.

In some embodiments, the one-time programmable memory may further comprise a fourth block and a fifth block. The fourth block is configured to record the number of variables which have been programmed into the one-time programmable memory. The fifth block is configured to record the number of storage units.

In some embodiments, the contents stored in the first block are generated by a binary encoding method, and the contents stored in the second block, the fourth block and the fifth block are generated through a one-hot encoding method.

In some embodiments, when a new variable needs to be added into the one-time programmable memory, the memory controller determines whether the number of variables which have been programmed into the one-time programmable memory has reached a first upper limit. If the number of variables which have been programmed into the one-time programmable memory has not reached the first upper limit, the memory controller sets a variable name for the new variable according to the number of variables which have been programmed into the one-time programmable memory and assigns one storage address to the new variable according to the number of storage addresses which have been used. In addition, the memory controller records the storage address corresponding to the new variable in the initial address unit of the initial-address-unit group corresponding to the new variable and records the initial-address-unit group corresponding to the initial address unit corresponding to the new variable in the initial address unit control corresponding to the new variable in the second block.

In some embodiments, when one of the variables needs to be modified, the memory controller determines whether the number of storage units which have been used has reached the second upper limit. If the number of storage units which have been used has not reached the second upper limit, the memory controller determines whether the number of times the variable has been modified has reached a third upper limit. If the number of times the variable has been modified has not reached the third upper limit, according to the number of storage addresses which have been used, the memory controller assigns the storage address which has not been used in the third block to the variable which needs to be modified and the memory controller records the storage address corresponding to the variable which needs to be modified in the initial address unit corresponding to the variable which needs to be modified in another initial-address-unit group. When the variable is modified, the memory controller increases the number of storage units which have been used in the fifth block by 1 and increases the number of times the variable has been modified in the second block by 1.

In some embodiments, when the content of the variable programmed into the one-time programmable memory needs to be read, the memory controller reads the initial address control unit corresponding to the variable which needs to be read to obtain the storage address stored in the initial address unit corresponding to the variable which needs to be read and according to the storage address corresponding to the variable which needs to be read, the memory controller reads the content of the variable which needs to be read.

An embodiment of the invention provides a tolerance method for the one-time programmable memory. The steps of the tolerance method for the one-time programmable memory comprises: configuring a first block, a second block and a third block in a one-time programmable memory of a one-time programmable memory device; and controlling, using a memory controller of the one-time programmable memory device, the first block, the second block and the third block. The first block comprises a plurality of initial-address-unit groups and each initial-address-unit group comprises a plurality of initial address units and each initial address unit corresponds to a variable to record the storage address of its corresponding variable. The second block comprises a plurality of initial address control units and each initial address control unit corresponds to one of the variables to record the corresponding initial-address-unit group of each variable. The third block comprises a plurality of storage units and each storage unit has a corresponding storage address, and the memory controller is configured to assign the storage addresses to the variables. The content of each variable is stored in the storage unit corresponding to the storage address corresponding to the variable. The number of variables is smaller than the number of storage units.

Other aspects and features of the invention will become apparent to those with ordinary skill in the art upon review of the following descriptions of specific embodiments of the one-time programmable memory device and the tolerance method for the one-time programmable memory.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
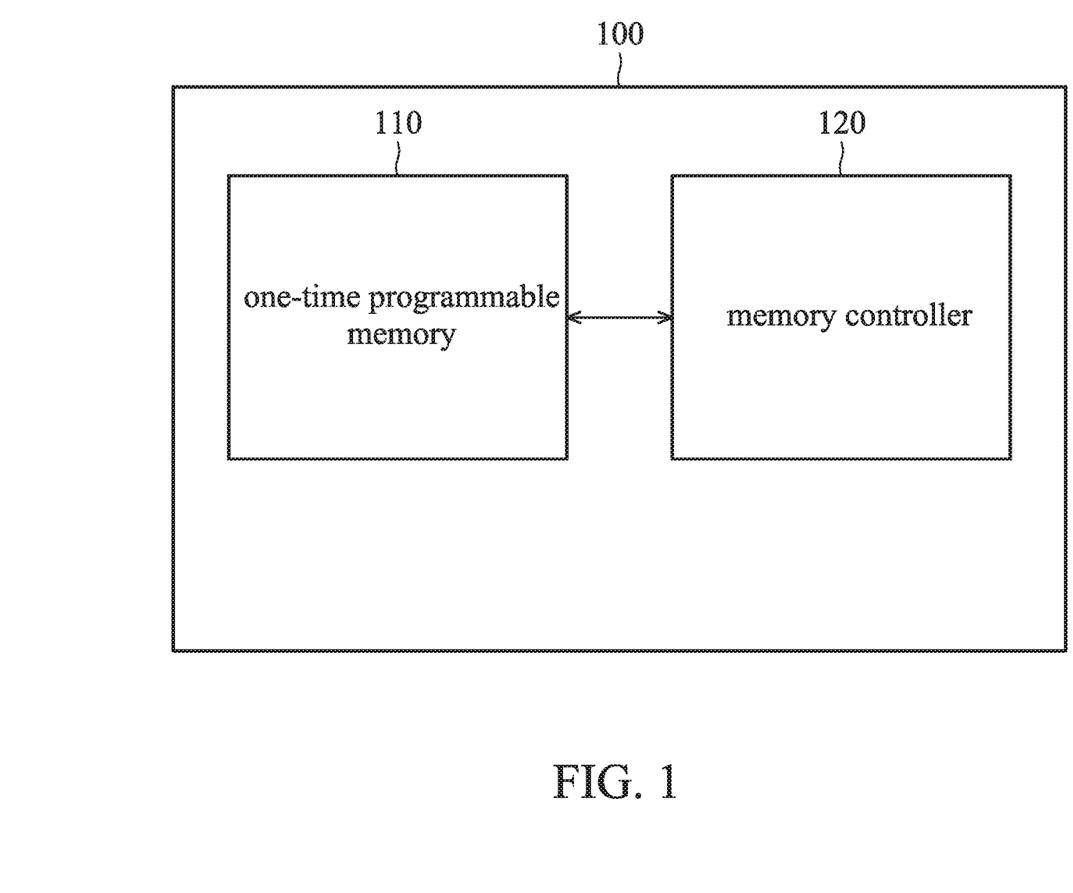
FIG. 1 is a schematic diagram of a one-time programmable memory device 100 according to an embodiment of the invention.

FIG. 1 is a schematic diagram of a one-time programmable memory device 100 according to an embodiment of the invention. As shown in FIG. 1, the one-time programmable memory device 100 may comprise a one-time programmable memory 110 and a memory controller 120. It should be noted that in order to clarify the concept of the invention, FIG. 1 presents a simplified block diagram in which only the elements relevant to the invention are shown. However, the invention should not be limited to what is shown in FIG. 1. The one-time programmable memory device 100 may comprise other elements.

According to an embodiment of the invention, a processor (not shown in figures) may transmit commands to the memory controller 120 through a bus (e.g. an advanced high-performance bus), and then, the memory controller 120 may perform the corresponding operations to the one-time programmable memory 110 according to the commands. In addition, according to an embodiment of the invention, the variables can be burned (programmed) into the one-time programmable memory 110 through a burning tool or burning software.

Figure 2:
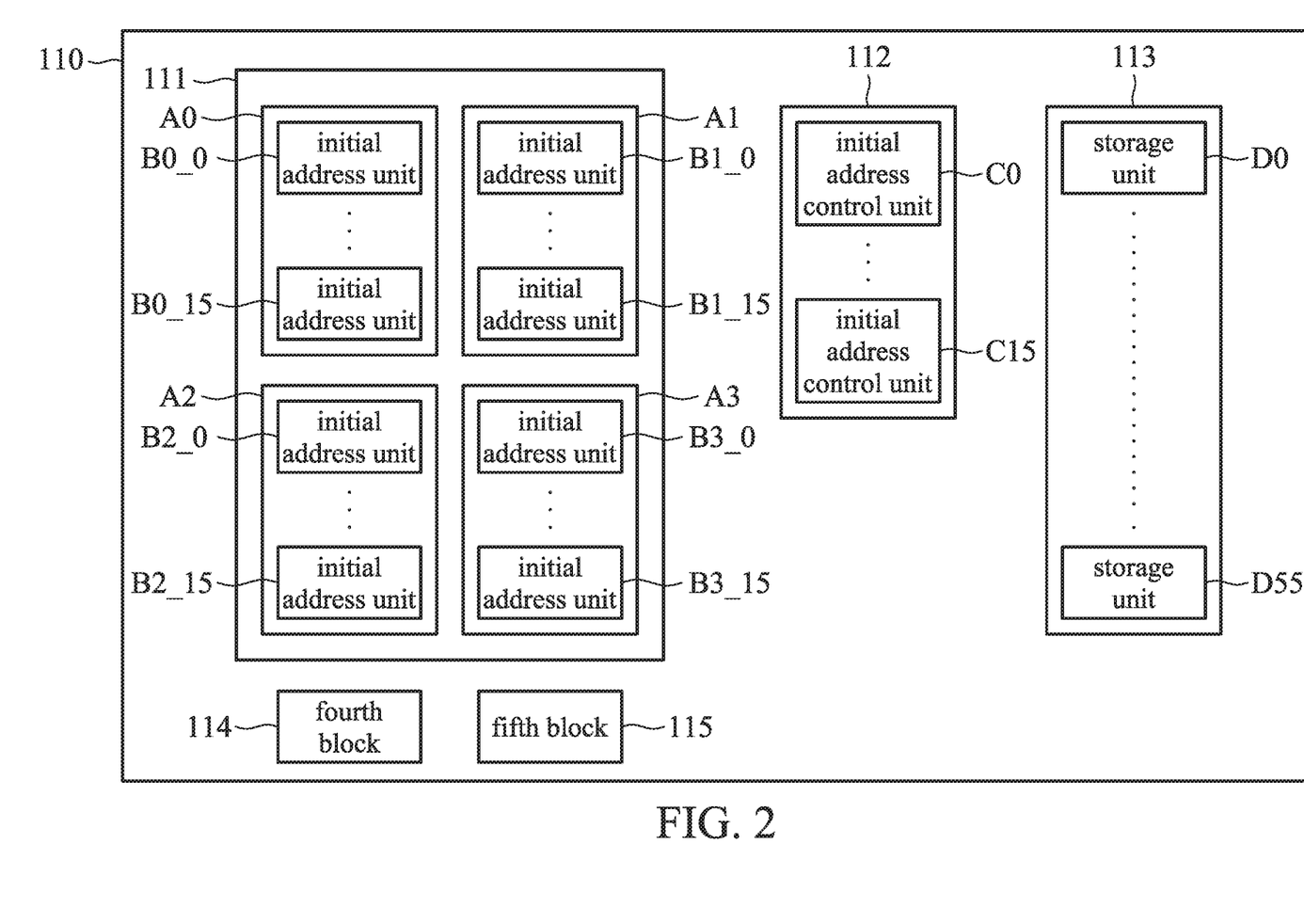
FIG. 2 is a schematic diagram of a one-time programmable memory 110 according to an embodiment of the invention.

FIG. 2 is a schematic diagram of a one-time programmable memory 110 according to an embodiment of the invention. As shown in FIG. 2, the one-time programmable memory 110 may comprise a first block 111, a second block 112, a third block 113, fourth block 114 and fifth block 115. It should be noted that in order to clarify the concept of the invention, FIG. 2 presents a simplified block diagram in which only the elements relevant to the invention are shown. However, the invention should not be limited to what is shown in FIG. 2.

According to an embodiment of the invention, the contents stored in the first block 111 are encoded through a binary encoding method, and the contents stored in the second block 112, the fourth block 114 and the fifth block 115 are encoded through a One-Hot Encoding method.

As shown in FIG. 2, the first block 111 of the one-time programmable memory 110 may comprise the 4 initial-address-unit groups A0~A3. Each initial-address-unit group may comprise 16 initial address units (i.e. there are 16 initial address units can be programmed into the one-time programmable memory 110). As shown in FIG. 2, initial-address-unit group A0 may comprise 16 initial address units B0_0~B0_15, initial-address-unit group A1 may comprise 16 initial address units B1_0~B1_15, initial-address-unit group A2 may comprise 16 initial address units B2_0~B2_15, and initial-address-unit group A3 may comprise 16 initial address units B3_0~B3_15. Each initial address unit may occupy 6 bits, but the invention should not be limited thereto. The second block 112 of the one-time programmable memory 110 may comprise 16 initial address control units C0~C15, and each initial address control unit may occupy 4 bits, but the invention should not be limited thereto. The third block 113 of the one-time programmable memory 110 may comprise 56 storage units D0~D55 (i.e. there are 56 storage addresses can be assigned), and each storage unit may occupy 64 bits, but the invention should not be limited thereto. The fourth block 114 of the one-time programmable memory 110 may occupy 16 bits, but the invention should not be limited thereto. The fifth block 115 of the one-time programmable memory 110 may occupy 56 bits, but the invention should not be limited thereto.

According to an embodiment of the invention, the first block 111 may comprise a plurality of initial-address-unit groups (e.g. initial-address-unit groups A0~A3). When a new variable is programmed into the one-time programmable memory 110, the new variable is programmed into the one-time programmable memory 110 from the first initial-address-unit group (initial-address-unit group A0). Only when the content of the variable which has been programmed into the one-time programmable memory 110 needs to be modified, another initial-address-unit group will be used. In the embodiments of the invention, the number of initial-address-unit groups is regarded as the maximum times of being able to modify a variable which has been programmed into the one-time programmable memory 110 (the maximum times comprises initially programming the variable into the one-time programmable memory 110). Taking FIG. 2 for example, the first block 111 comprise 4 initial-address-unit groups, therefore, each variable only can be modified 4 times, but the invention should not be limited thereto. When a new variable needs to be programmed into the one-time programmable memory 110, the memory controller 120 may sequentially assign a initial address unit (e.g. B0_0~B0_15) of the first initial-address-unit group to the new variable which needs to be programmed into the one-time programmable memory 110. That is to say, each initial address unit may be assigned a corresponding variable. In the embodiments of the invention, each initial address unit may record the storage address of its corresponding variable. According to an embodiment of the invention, when the variables are programmed into the one-time programmable memory 110, the memory controller 120 may sequentially a variable number to each variable. Each initial address unit may also record the variable number and variable name of its corresponding variable. Table 1-1 is used for illustration below.

According to an embodiment of the invention, the second block 112 may comprise a plurality of initial address control units (e.g. initial address control units C0~C15). The number of initial address control units may be the same as the number of variables which can be programmed into the one-time programmable memory 110. That is to say, each initial address control unit may be assigned a corresponding variable. In the embodiments of the invention, the initial address control units are configured to record the corresponding initial-address-unit group of each variable (i.e. recording that the initial address unit corresponding to each variable is in which initial-address-unit group). For example, if a variable is corresponded to one of the initial address units of the first initial-address-unit group (e.g. the initial-address-unit group A0), the initial address control unit will record 1 (after encoding, the encoded content of "1" may be 4'0001). Table 1-1 is used for illustration below. According to an embodiment of the invention, the value recorded by the initial address control unit may have an upper limit. For example, if the one-time programmable memory 110 comprises 4 initial-address-unit groups, the upper limit will be 4. (after encoding, the encoded content of "4" may be 4'1111). When the value recorded by the initial address control unit has been reached the upper limit, it means that the number of times the variable has been modified corresponding to the initial address control unit has been reached the upper limit, and the variable cannot be modified anymore.

According to an embodiment of the invention, the third block 113 may comprise a plurality of storage units (e.g. storage units D0~D55). Each storage unit may have a corresponding storage address. Each storage address may have a storage address number (as shown in Table 1-1 and Table 2-1). When a new variable is programmed into the one-time programmable memory 110, the memory controller 120 may assign a storage address to the new variable which is programmed into the one-time programmable memory 110. The content of the variable which is programmed into the one-time programmable memory 110 may be stored in the storage unit corresponding to the corresponding storage address of the variable, and each initial address unit may record the storage address corresponding to its corresponding variable. As shown in FIG. 2, the number of variables which can be programmed into the one-time programmable memory 110 may be smaller than the number of storage units (i.e. the number of storage addresses).

In the embodiments of the invention, when the content of the variable needs to be modified, the memory controller 120 may assign a new storage address to the variable, and the storage unit storing the content of the variable originally will be abandoned.

According to an embodiment of the invention, the fourth block 114 is configured to record the number of variables which have been programmed into the one-time programmable memory 110 (the number is expressed as MAX_USED_NO below). The initial value of MAX_USED_NO is set to 0 (t after encoding, the content of the initial value may be 16'h0000). After a new variable is programmed into the one-time programmable memory 110, the value of MAX_USED_NO will be increased by 1. In the embodiments of the invention, the upper limit of the number of variables which can be programmed into the one-time programmable memory 110 (i.e. the upper limit of MAX_USED_NO) may be defined in the fourth block 114 in advance. When the value of MAX_USED_NO has reached the upper limit, the new variable will not be able to be programmed into the one-time programmable memory 110. That is to say, in the embodiments of the invention, when a new variable needs to be programmed into the one-time programmable memory 110, the memory controller 120 may determine whether the value of MAX_USED_NO has reached the upper limit first. If the value of MAX_USED_NO has reached the upper limit, the memory controller 120 may not establish new variable in the one-time programmable memory 110. In addition, if the value of MAX_USED_NO has reached the upper limit, when a variable which is indicated to be modified is not one of the variables which have been programmed into the one-time programmable memory 110, the memory controller 120 may indicate the variable to be an invalid variable. Details of the fourth block 114 are illustrated through FIG. 2, Table 1-2 and Table 1-3 below.

According to an embodiment of the invention, the fifth block 115 is configured to record the number of storage addresses which have been used (the number is expressed as MAX_USED_ADDR below). The initial value of MAX_USED_ADDR is set to 0 (after encoding, the content of the initial value may be 56'h00_0000_0000_0000). When the memory controller 120 assigns a storage address to a variable, the value of MAX_USED_ADDR will be increased by 1. In the embodiments of the invention, the upper limit of the number of storage addresses (i.e. the upper limit of MAX_USED_ADDR) is defined in the fifth block 115 in advance. When the value of MAX_USED_ADDR has reached the upper limit (i.e. all storage units have been used), the memory controller 120 will not assign the storage address to the variable. Details of fifth block 115 are illustrated in FIG. 2, Table 1-3, and Table 2-3.

TABLE 1-1

| Variable Number | Variable Name | Encoded content (first block) | Encoded content (second block) |
|---|---|---|---|
| 0 | Setting 0 | 6'b000000 | 4'b0001 |

TABLE 1-2

| | Upper limit of the number of variables | Encoded content | the number of programmed variable (i.e. MAX_USED_NO) |
|---|---|---|---|
| Fourth Block | 16 | 16'h0001 | 1 |

TABLE 1-3

| | Upper limit of the number of storage addresses | Encoded content | the number of used storage units (i.e. MAX_USED_ADDR) |
|---|---|---|---|
| Fifth Block | 56 | 56'h000_0000_0001 | 1 |

According to an embodiment of the invention, Table 1-1~Table 1-3 respectively shows the information recorded in first block 111, second block 112, fourth block 114 and fifth block 115 when the first variable is programmed into the one-time programmable memory 110. It should be noted that Table 1-1~Table 1-3 are only used to illustrate the embodiments of the invention, but the invention should not be limited thereto. Referring to FIG. 2 and Table 1-1, when the first variable Setting 0 is programmed into the one-time programmable memory 110, the memory controller 120 may assign a variable number 0 to the first variable Setting 0 according to the initial value (i.e. the initial value of MAX_USED_NO is 0, and the encoded content of the initial value may be 16'h0000) stored in the fourth block 114. In addition, the memory controller 120 may assign a storage address 6'b000000 to the first variable Setting 0 according to the initial value stored in the fifth block 115 (i.e. the initial value of MAX_USED_ADDR is 0, and the encoded content of the initial value may be 56'h0000_0000_0000), and the initial address unit B0_0 of the initial-address-unit group A0 of the first block 111 may record the storage address 6'b000000 corresponding to the first variable Setting 0. The initial address control unit C0 of the second block 112 may record the initial-address-unit group (e.g. the initial-address-unit group A0 is recorded as 1, and after encoding, the content corresponding to the initial-address-unit group A0 may be 4'b0001) corresponding to the initial address unit B0_0 corresponding to variable Setting 0. In other words, the initial address control unit C0 of the second block 112 may record the number of times variable Setting 0 has been modified, wherein variable Setting 0 initially programmed into the one-time programmable memory 110 may be regarded the first time that variable Setting 0 is modified, i.e. the initial-address-unit group A0 is recorded as 1. The content corresponding to the first variable Setting 0 may be stored in the storage unit D0 corresponding to the storage address 6'b0000000. Then, referring to FIG. 2 and Table 1-2, after the first variable Setting 0 is programmed into the one-time programmable memory 110, the value stored in the fourth block 114 may be increased by 1 (i.e. the value of MAX_USED_NO is changed to 1, and the encoded content of the value may be 16'h0001). In the embodiment, the memory controller 120 may set the variable number of next variable Setting 1 according to the value stored in the fourth block 114 shown in Table 1-2. In addition, referring to FIG. 2 and Table 1-3, after the first variable Setting 0 is programmed into the one-time programmable memory 110, the value stored in the fifth block 115 may be increased by 1 (i.e. the value of MAX_USED_ADDR is changed to 1, and the encoded content of the value may be 56'h000_0000_0001). In the embodiment, the memory controller 120 may assign a storage address to the next variable Setting 1 according to the value stored in the fifth block 115 shown in Table 1-3.

TABLE 2-1

| Variable Number | Variable Name | Encoded content (first block) | Encoded content (second block) |
|---|---|---|---|
| 0 | Setting_0 | 6'b0000000 | 4'b0001 |
| 1 | Setting_1 | 6'b0000001 | 4'b0001 |
| 2 | Setting_2 | 6'b0000010 | 4'b0001 |
| 3 | Setting_3 | 6'b0000011 | 4'b0001 |
| 4 | Setting_4 | 6'b0000100 | 4'b0001 |
| 5 | Setting_5 | 6'b0000101 | 4'b0001 |
| . | . | . | . |
| . | . | . | . |
| 15 | Setting_15 | 6'b001111 | 4'b0001 |

TABLE 2-2

| | Upper limit of the number of variables | Encoded content | the number of programmed variable (i.e. MAX_USED_NO) |
|---|---|---|---|
| Fourth Block | 16 | 16'hFFFF | 16 |

TABLE 2-3

| | Upper limit of the number of storage addresses | Encoded content | the number of used storage units (i.e. MAX_USED_ADDR) |
|---|---|---|---|
| Fifth Block | 56 | 56'h000_0001_FFFF | 16 |

According to an embodiment of the invention, Table 2-1~Table 2-3 respectively shows the information recorded in first block 111, second block 112, fourth block 114 and the fifth block 115 when all variables are programmed into the one-time programmable memory 110. It should be noted that Table 2-1~Table 2-3 are only used to illustrate the embodiments of the invention, but the invention should not be limited thereto. Referring to FIG. 2 and Table 2-1, after the variables Setting 0~Setting 15 are programmed into the one-time programmable memory 110, the initial address units B0_0~B0_15 of the initial-address-unit group A0 of the first block 111 may respectively record the storage addresses corresponding to the variables Setting 0~Setting 15, wherein the storage addresses corresponding to the variables Setting 0~Setting 15 may respectively corresponds to storage number 0-15. The initial address control units C0~C15 of the second block 112 may record the initial-address-unit group (e.g. the initial-address-unit group A0 is recorded as 1, and after encoding, the content corresponding to the initial-address-unit group A0 may be 4'b0001) corresponding to the initial address units B0_0~B0_15 corresponding to variable Setting 0. The contents corresponding to the variables Setting 0~Setting 15 may be respectively stored in the storage units D0~D15. Then, referring to FIG. 2 and Table 2-2, after the variables Setting 0~Setting 15 are programmed into the one-time programmable memory 110, the value stored in the fourth block 114 is 16 (i.e. the value of MAX_USED_NO is 16 and the encoded content of the value may be 16'hFFFF). Because the value stored in the fourth block 114 has reached the upper limit, the memory controller 120 cannot establish a new variable in the one-time programmable memory 110. In addition, referring to FIG. 2 and Table 2-3, after the variables Setting 0~Setting 15 are programmed into the one-time programmable memory 110, the value stored in the fifth block 115 is 16 (i.e. the value of MAX_USED_ADDR is 16, and the encoded content of the value may be 56'h0000_0000_FFFF). It means that there are 40 storage addresses remaining in the fifth block 115 to provide memory controller 120 to assign. When the content of one of the variables Setting 0~Setting 15 needs to be modified, the memory controller 120 may assign a storage address which has not been used to the variable whose content needs to be modified according to the value stored in fifth block 115 shown in Table 2-3. Details for how to modify the content of variable are illustrated through Table 3-1~Table 3-3.

TABLE 3-1

| Variable Number | Variable Name | Encoded content (first block) | | Encoded content (second block) |
|---|---|---|---|---|
| 0 | Setting_0 | 6'b0000000 | | 4'b0001 |
| 1 | Setting_1 | 6'b0000001 | 6'b010000 | 4'b0011 |
| 2 | Setting_2 | 6'b0000010 | | 4'b0001 |
| 3 | Setting_3 | 6'b0000011 | | 4'b0001 |
| 4 | Setting_4 | 6'b0000100 | | 4'b0001 |
| 5 | Setting_5 | 6'b0000101 | | 4'b0001 |
| . | . | . | | . |
| . | . | . | | . |
| . | . | . | | . |
| 15 | Setting 15 | 6'b001111 | | 4'b0001 |

TABLE 3-2

| | Upper limit of the number of variables | Encoded content | the number of programmed variable (i.e. MAX_USED_NO) |
|---|---|---|---|
| Fourth Block | 16 | 16'hFFFF | 16 |

TABLE 3-3

| | Upper limit of the number of storage addresses | Encoded content | the number of used storage units (i.e. MAX_USED_ADDR) |
|---|---|---|---|
| Fifth Block | 56 | 56'h000_0001_FFFF | 17 |

According to an embodiment of the invention, Table 3-1~Table 3-3 respectively shows the information recorded in first block 111, second block 112, fourth block 114 and fifth block 115 when the content of a variable needs to be modified. It should be noted that Table 3-1~Table 3-3 are only used to illustrate the embodiments of the invention, but the invention should not be limited thereto. Referring to FIG. 2 and Table 3-1, when the content of variable Setting 1 needs to be modified, the memory controller 120 may assign a new storage address to variable Setting 1 according to the value (56'h000_0000_FFFF) stored in the fifth block 115 as shown in Table 2-3. The initial address unit B1_1 of the initial-address-unit group A1 of the first block 111 may record the new storage address 6'b010000 corresponding to variable Setting 1. The initial address control unit C1 of the second block 112 may record the initial-address-unit group (e.g. the initial-address-unit group A1 is recorded as 2, and after encoding, the content corresponding to the initial-address-unit group A0 may be 4'b0011) corresponding to the new initial address unit B1_1 corresponding to variable Setting 1. In other words, the number of times variable Setting 1 has been modified, as recorded in the initial address control unit C1 of the second block 112, will be increased by 1 (after being increased by 1, the content of the initial address control unit C1 may be 4'b0011). The modified content of variable Setting 1 may be stored in the storage unit D16 corresponding to the storage address 6'b010000. In addition, the storage unit B0_1 originally assigned to variable Setting 1 will be abandoned. Then, referring to FIG. 2 and Table 3-2, because the value stored in the fourth block 114 has reached the upper limit, the content of Table 3-2 is the same as the content of Table 2-2. In addition, referring to FIG. 2 and Table 3-3, after the content of variable Setting 1 has been modified, the value stored in the fifth block 115 may be increased by 1 (i.e. the value of MAX_USED_ADDR is 17, and the encoded content of the value may be 56'h0000_0001 FFFF). When the content of another variable needs to be modified next time, the memory controller 120 may assign a new storage address to the variable whose content needs to be modified according to the value stored in the fourth block 114 as shown in Table 3-3.

According to an embodiment of the invention, when the content of the variable needs to be read, according to the variable number of variable which needs to be read, the memory controller 120 may read the initial address unit corresponding to the variable first to know which initial-address-unit group is the initial address unit corresponding to the variable in to obtain the storage address recorded in the initial address unit corresponding to the variable. Then, the memory controller 120 may read the content corresponding to the variable from the storage unit corresponding to the storage address. For example, referring to FIG. 2 and Table 2-1, when the memory controller 120 knows that the content of variable Setting 1 needs to be read according to the variable number (e.g. variable number 1) indicated in a read command, the memory controller 120 may read the initial address control unit C1 corresponding to variable Setting 1 first to know which initial-address-unit group is the initial address unit corresponding to variable Setting 1 is in. When the memory controller 120 knows that the initial address unit corresponding to variable Setting 1 is in the initial-address-unit group A0, the memory controller 120 will know the initial address unit corresponding to variable Setting 1 is the initial address unit B0_1. Therefore, the memory controller 120 may obtain the storage address 6'b000001 recoded in the initial address unit B0_1. Then, the memory controller 120 may read the content corresponding to variable Setting 1 from the storage D1 corresponding to the storage address 6'b000001.

Figure 3:
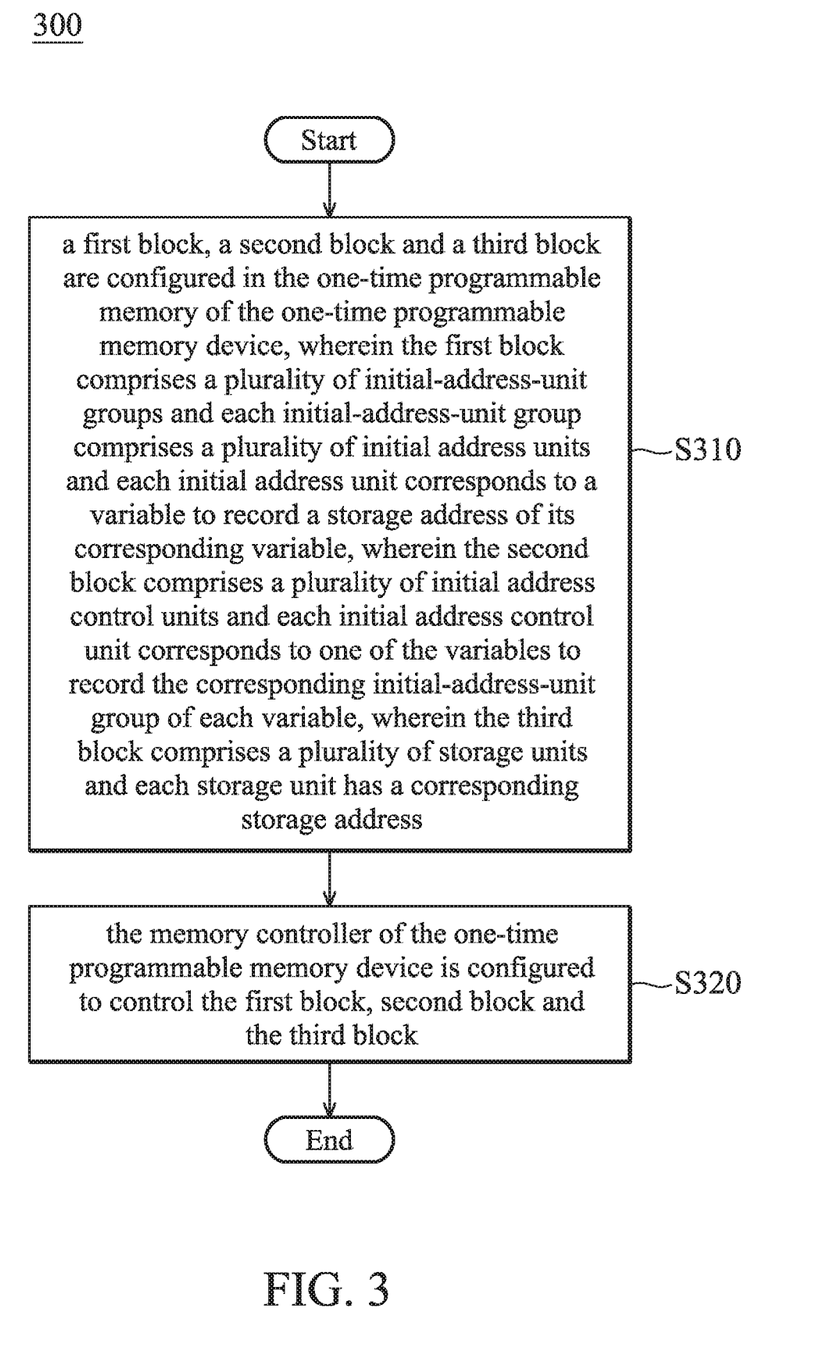
FIG. 3 is a flow chart 300 illustrating a tolerance method for the one-time programmable memory according to an embodiment of the invention.

FIG. 3 is a flow chart 300 illustrating a tolerance method for the one-time programmable memory according to an embodiment of the invention. The tolerance method for the one-time programmable memory can be applied to the one-time programmable memory device 100. In step S310, a first block, a second block and a third block are configured in the one-time programmable memory of the one-time programmable memory device 100. In step S320, the memory controller of the one-time programmable memory device 100 is configured to control the first block, second block and the third block. In the embodiment, the first block may comprise a plurality of initial-address-unit groups, and each initial-address-unit group may comprise a plurality of initial address units. Each initial address unit may correspond to a variable to record the storage address of each variable. In the embodiment, the second block comprises a plurality of initial address control units, and each initial address control unit may correspond to one variable. In the embodiment, the third block may comprise a plurality of storage unit and each storage unit has a corresponding storage address. The memory controller is configured to assign the storage addresses to the variables. The content corresponding to each variable may be stored in the storage unit corresponding to the corresponding storage address of the variable. The number of variables is fewer than the number of storage units.

According to an embodiment of the invention, the tolerance method for the one-time programmable memory further comprises the steps of configuring a fourth block in the one-time programmable memory of the one-time programmable memory device 100 to record the number of variables which are programmed into the one-time programmable memory, and configuring a fifth block in the one-time programmable memory of the one-time programmable memory device 100 to record the number of storage addresses.

According to an embodiment of the invention, in the tolerance method for the one-time programmable memory, a binary encoding method is adopted to generate the contents stored in the first block and a one-hot encoding method is adopted to generate the contents stored in the second block, fourth block and the fifth block.

Figure 4A:
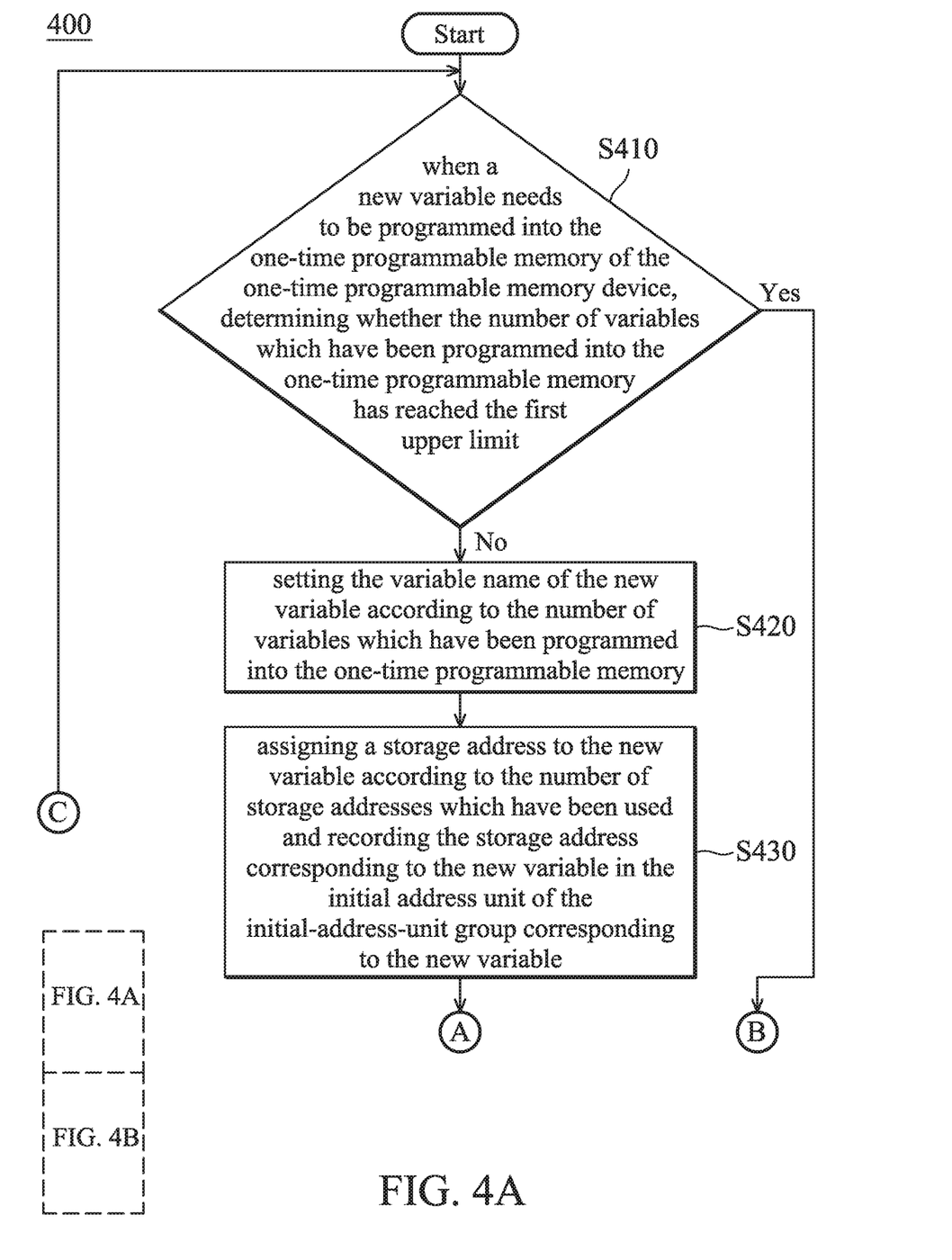
FIG. 4A-4B is a flow chart 400 illustrating of adding new variable in the tolerance method for the one-time programmable memory according to an embodiment of the invention.
Figure 4B:
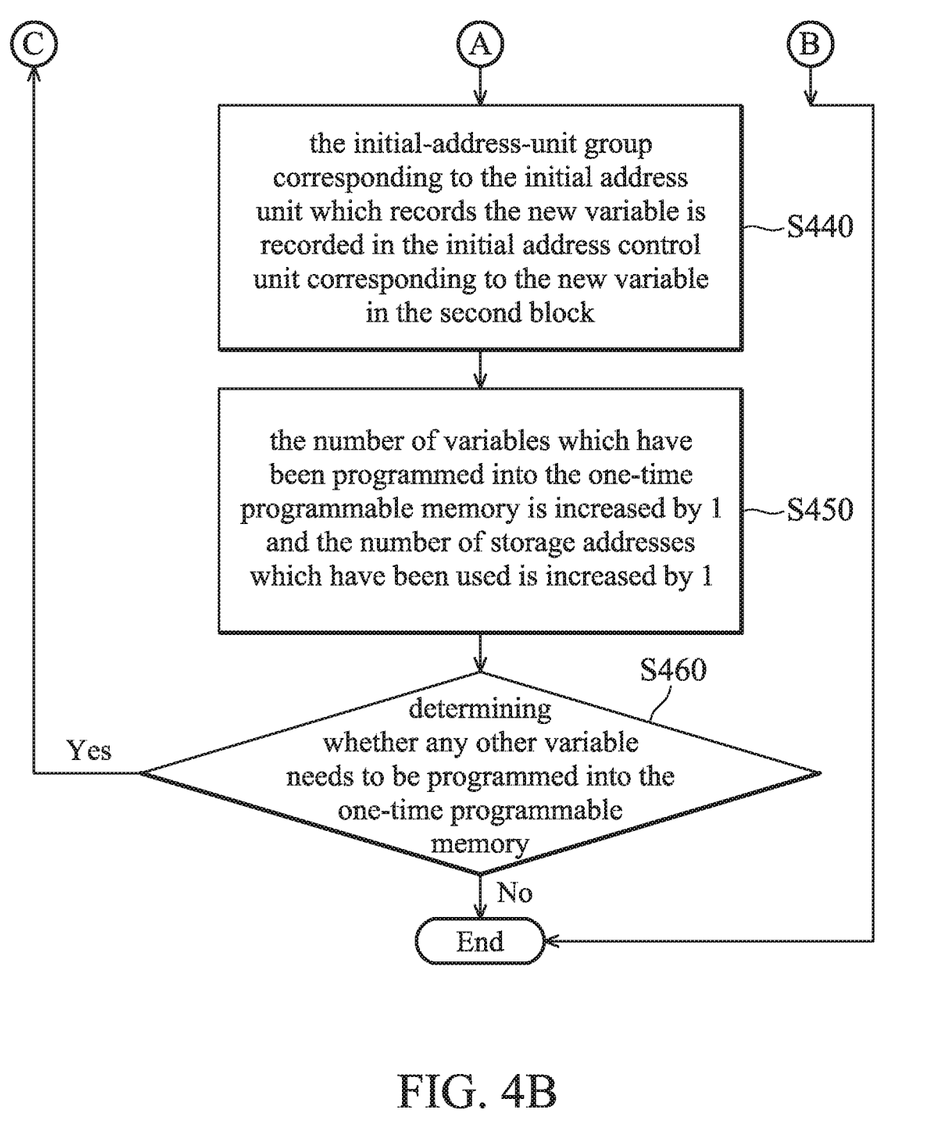

FIG. 4A-4B is a flow chart 400 illustrating of adding new variable in the tolerance method for the one-time programmable memory according to an embodiment of the invention. The flow of adding new variable in the tolerance method for the one-time programmable memory can be applied to the one-time programmable memory device 100. In step S410, when a new variable needs to be programmed into the one-time programmable memory of the one-time programmable memory device 100, the memory controller of the one-time programmable memory device 100 may determine whether the number of variables which have been programmed into the one-time programmable memory has reached the first upper limit (i.e. whether the value of MAX_USED_NO has reached the upper limit). If the number of variables which have been programmed into the one-time programmable memory has reached the first upper limit, the flow ends.

If the number of variables which have been programmed into the one-time programmable memory has not reached the first upper limit, step S420 is performed. In step S420, the memory controller of the one-time programmable memory device 100 sets the variable name of the new variable according to the number of variables which have been programmed into the one-time programmable memory (i.e. the value of MAX_USED_NO). In step S430, the memory controller of the one-time programmable memory device 100 assigns a storage address to the new variable according to the number of storage addresses which have been used (i.e. the value of MAX_USED_ADDR) and record the storage address corresponding to the new variable in the initial address unit of the initial-address-unit group corresponding to the new variable. In step S440, the initial-address-unit group corresponding to the initial address unit which records the new variable is recorded in the initial address control unit corresponding to the new variable in the second block.

In step S450, the number of variables which have been programmed into the one-time programmable memory is increased by 1 (i.e. the value of MAX_USED_NO recorded in the fourth block is increased by 1) and the number of storage addresses which have been used is increased by 1 (i.e. the value of MAX_USED_ADDR recorded in the fifth block is increased by 1) through the memory controller of the one-time programmable memory device 100. In step S460, the memory controller of the one-time programmable memory device 100 is configured to determine whether any other variable needs to be programmed into the one-time programmable memory of the one-time programmable memory device 100. If there is another variable needs to be programmed into the one-time programmable memory of the one-time programmable memory device 100, the flow backs to step S410.

Figure 5A:
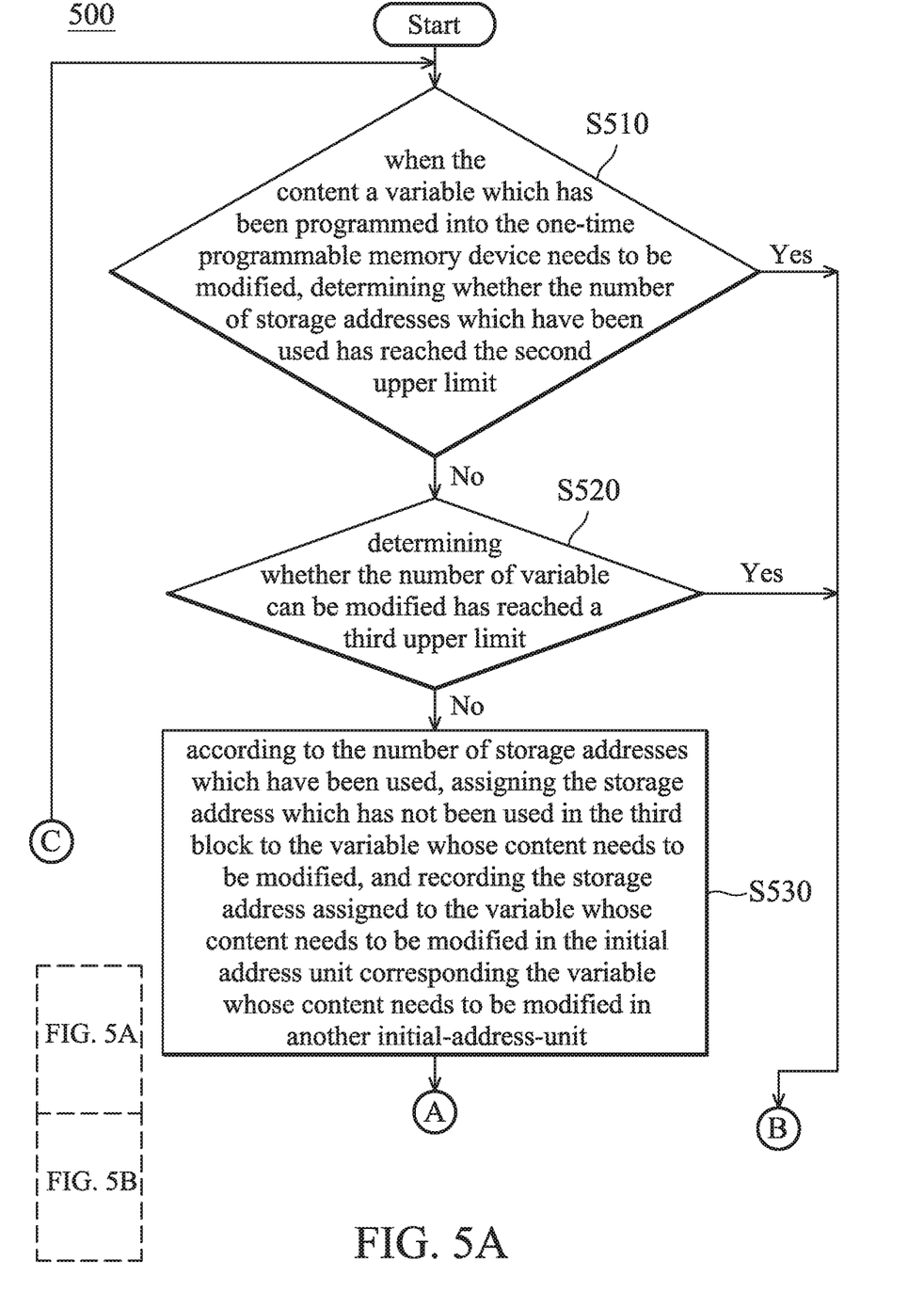
FIG. 5A-5B is a flow chart 500 illustrating of modifying the content of the variable in the tolerance method for the one-time programmable memory according to an embodiment of the invention.
Figure 5B:
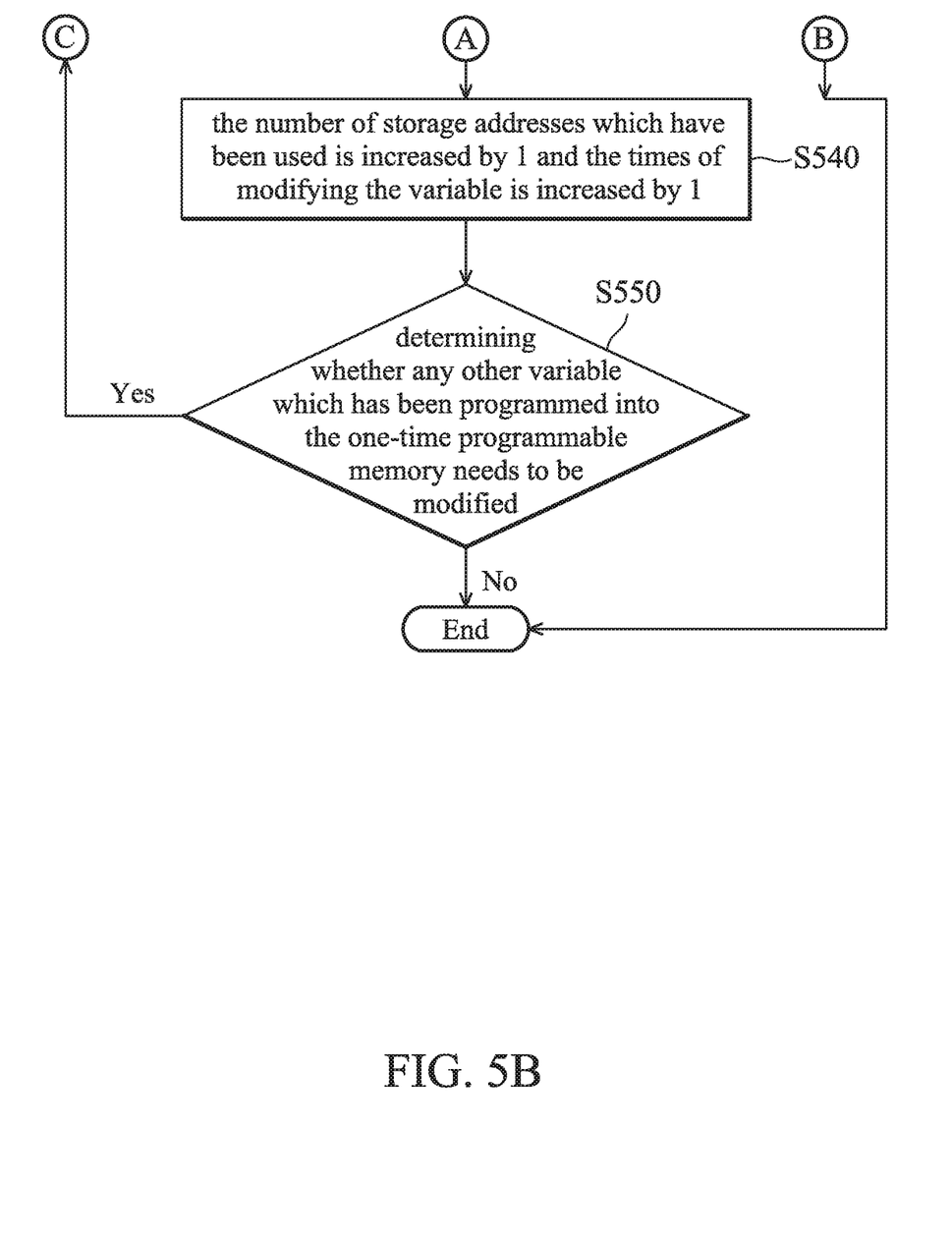

FIG. 5A-5B is a flow chart 500 illustrating of modifying the content of the variable in the tolerance method for the one-time programmable memory according to an embodiment of the invention. The flow of modifying the content of the variable in the tolerance method for the one-time programmable memory can be applied to the one-time programmable memory device 100. In step S510, when the content a variable which has been programmed into the one-time programmable memory device 100 needs to be modified, the memory controller of the one-time programmable memory device 100 determines whether the number of storage addresses which have been used has reached the second upper limit. If the number of storage addresses which have been used has reached the second upper limit, the flow ends.

If the number of storage addresses which have been used has not reached the second upper limit, step S520 is performed. In step S520, the memory controller of the one-time programmable memory device 100 is configured to determine whether the number of variable can be modified has reached a third upper limit. If the number of variable can be modified has reached the third upper limit, the flow ends.

If the number of variable can be modified has not reached the third upper limit, step S530 is performed. In step S530, according to the number of storage addresses which have been used (i.e. the value of MAX_USED_ADDR), the memory controller of the one-time programmable memory device 100 is configured to assign the storage address which has not been used in the third block to the variable whose content needs to be modified, and record the storage address assigned to the variable whose content needs to be modified in the initial address unit corresponding the variable whose content needs to be modified in another initial-address-unit.

In step S540, after the content of the variable is modified, the number (recorded in the fifth block) of storage addresses which have been used is increased by 1 and the times (recorded in the second block) of modifying the variable is increased by 1 through the memory controller of the one-time programmable memory device 100. In step S550, the memory controller of the one-time programmable memory device 100 determines whether any other variable which has been programmed into the one-time programmable memory needs to be modified. If there is another variable which has been programmed into the one-time programmable memory needs to be modified, the flow backs to S510.

Figure 6:
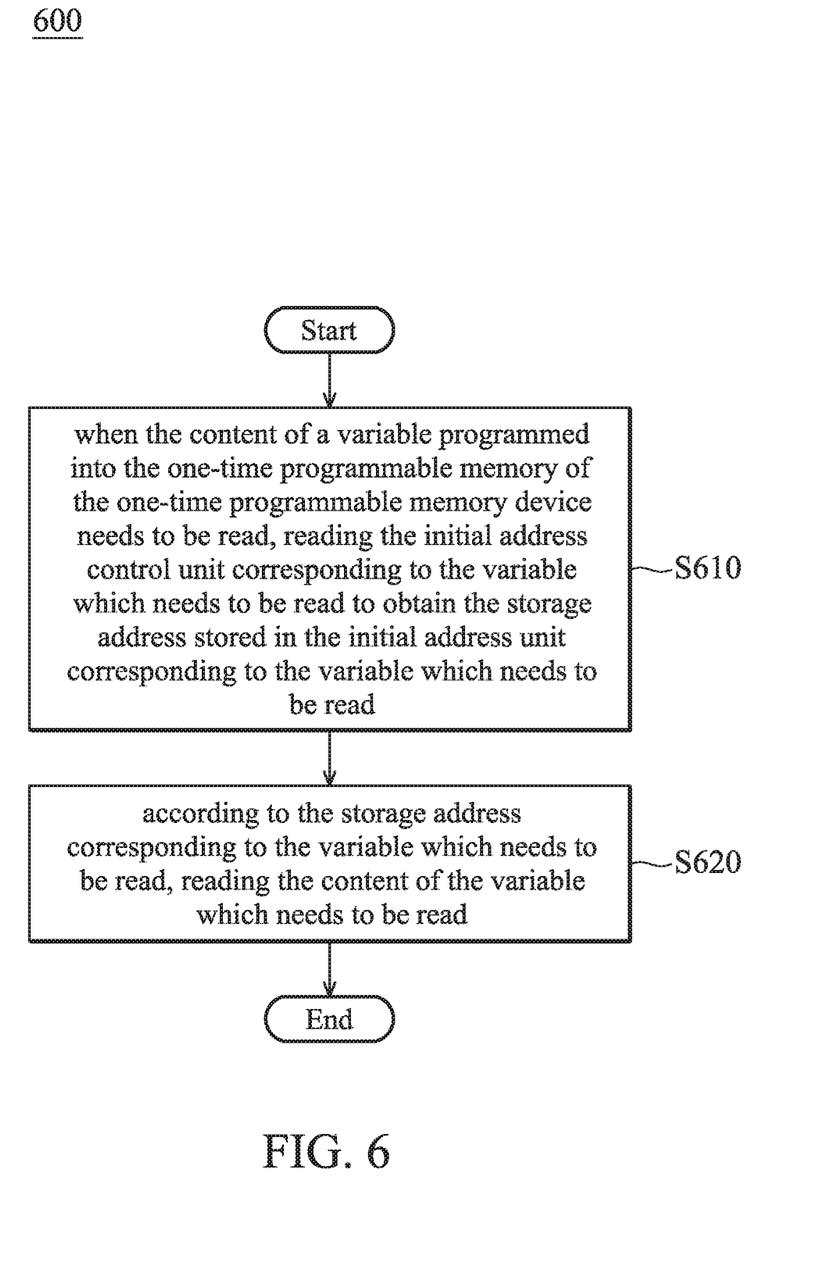
FIG. 6 is a flow chart 600 illustrating of reading the content of the variable in the tolerance method for the one-time programmable memory according to an embodiment of the invention.

FIG. 6 is a flow chart 600 illustrating of reading the content of the variable in the tolerance method for the one-time programmable memory according to an embodiment of the invention. The flow of reading the content of the variable in the tolerance method for the one-time programmable memory can be applied to the one-time programmable memory device 100. In step S610, when the content of a variable programmed into the one-time programmable memory of the one-time programmable memory device 100 needs to be read, the memory controller of the one-time programmable memory device 100 is configured to read the initial address control unit corresponding to the variable which needs to be read to obtain the storage address stored in the initial address unit corresponding to the variable which needs to be read. In step S620, according to the storage address corresponding to the variable which needs to be read, the memory controller of the one-time programmable memory device 100 is configured to read the content of the variable which needs to be read.

According to the tolerance method for the one-time programmable memory provided in the embodiments of the invention, when a variable needs to be modified, other variables do not need to be programmed again. Therefore, the storage space of one-time programmable memory will be saved. In addition, according to the tolerance method for the one-time programmable memory provided in the embodiments of the invention, the user can modify the contents of variables more flexibly.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A one-time programmable memory device, comprising:
    a one-time programmable memory, comprising a first block, a second block and a third block; and
    a memory controller, coupled to the one-time programmable memory and controlling the first block, the second block and the third block;
    wherein the first block comprises a plurality of initial-address-unit groups and each initial-address-unit group comprises a plurality of initial address units and wherein in each initial-address-unit group, each initial address unit corresponds to a corresponding variable and records encoded content associated with a storage address associated with its corresponding variable;
    wherein the second block comprises a plurality of initial address control units and each initial address control unit corresponds to one of the variables, wherein each initial address control unit records encoded content associated with the corresponding initial-address-unit group associated with its corresponding variable;
    wherein the third block comprises a plurality of storage units, wherein each storage unit has a corresponding storage address and stores content of one variable associated with the corresponding storage address of the storage unit, and the memory controller is configured to assign the storage addresses to the variables; and
    wherein the number of variables is smaller than the number of storage units.

2. The one-time programmable memory device of claim 1, wherein the one-time programmable memory further comprises:
    a fourth block, configured to record the number of variables which have been programmed into the one-time programmable memory; and
    a fifth block, configured to record the number of storage units which have been used.

3. The one-time programmable memory device of claim 2, wherein contents stored in the first block are generated by a binary encoding method, and the contents stored in the fourth block and the fifth block are generated through a one-hot encoding method.

4. The one-time programmable memory device of claim 2, wherein when a new variable is added into the one-time programmable memory, the memory controller determines whether the number of variables which have been programmed into the one-time programmable memory has reached a first upper limit.

5. The one-time programmable memory device of claim 4, wherein if the number of variables which have been programmed into the one-time programmable memory has not reached the first upper limit, the memory controller sets a variable name for the new variable according to the number of variables which have been programmed into the one-time programmable memory and assigns one storage address to the new variable according to the number of storage addresses which have been used, and the memory controller records the storage address corresponding to the new variable in the initial address unit of the initial-address-unit group corresponding to the new variable and records the initial-address-unit group corresponding to the initial address unit corresponding to the new variable in the initial address unit control corresponding to the new variable in the second block.

6. The one-time programmable memory device of claim 2, wherein when one of the variables is modified, the memory controller determines whether the number of storage units which have been used has reached a second upper limit.

7. The one-time programmable memory device of claim 6, wherein if the number of storage units which have been used has not reached the second upper limit, the memory controller determines whether the number of times the variable has been modified has reached a third upper limit.

8. The one-time programmable memory device of claim 7, wherein if the number of times the variable has been modified has not reached the third upper limit, according to the number of storage addresses which have been used, the memory controller assigns the storage address which has not been used in the third block to the variable which is modified and the memory controller records the storage address corresponding to the variable which is modified in the initial address unit corresponding to the variable which is modified in another initial-address-unit group.

9. The one-time programmable memory device of claim 8, wherein when the variable is modified, the memory controller increases the number of storage units which have been used in the fifth block by 1 and increases the number of times the variable has been modified in the second block by 1.

10. The one-time programmable memory device of claim 1, wherein when the content of the variable programmed into the one-time programmable memory is read, the memory controller reads the initial address control unit corresponding to the variable which is read to obtain the storage address stored in the initial address unit corresponding to the variable which is read and according to the storage address corresponding to the variable which is read, the memory controller reads the content of the variable which needs to be read.

11. A tolerance method for the one-time programmable memory, comprising:
   configuring a first block, a second block and a third block in a one-time programmable memory of a one-time programmable memory device; and
   controlling, by a memory controller of the one-time programmable memory device, the first block, the second block and the third block;
   wherein the first block comprises a plurality of initial-address-unit groups and each initial-address-unit group comprises a plurality of initial address units and wherein in each initial-address-unit group, each initial address unit corresponds to a corresponding variable and records encoded content associated with a storage address of associated with its corresponding variable;
   wherein the second block comprises a plurality of initial address control units and each initial address control unit corresponds to one of the variables, wherein each initial address control unit records encoded content associated with the corresponding initial-address-unit group associated with its corresponding variable;
   wherein the third block comprises a plurality of storage units, wherein each storage unit has a corresponding storage address and stores content of one variable associated with the corresponding storage address of the storage unit, and the memory controller is configured to assign the storage addresses to the variables; and
   wherein the number of variables is smaller than the number of storage units.

12. The tolerance method for the one-time programmable memory of claim 11, further comprising:
   configuring a fourth block in the one-time programmable memory to record the number of variables which have been programmed into the one-time programmable memory; and
   configuring a fifth block in the one-time programmable memory to record the number of storage units which has been used.

13. The tolerance method for the one-time programmable memory of claim 12, wherein contents stored in the first block are generated by a binary encoding method, and the contents stored in the fourth block and the fifth block are generated through a one-hot encoding method.

14. The tolerance method for the one-time programmable memory of claim 12, further comprising:
   when a new variable is added into the one-time programmable memory, determining, by the memory controller, whether the number of variables which have been programmed into the one-time programmable memory has reached a first upper limit.

15. The tolerance method for the one-time programmable memory of claim 14, further comprising:
   if the number of variables which have been programmed into the one-time programmable memory has not reached the first upper limit, setting, by the memory controller, a variable name for the new variable according to the number of variables which have been programmed into the one-time programmable memory and assigning one storage address to the new variable according to the number of storage addresses which have been used;
   recording, by the memory controller, the storage address corresponding to the new variable in the initial address unit of the initial-address-unit group corresponding to the new variable; and
   recording, by the memory controller, the initial-address-unit group corresponding to the initial address unit corresponding to the new variable in the initial address unit control corresponding to the new variable in the second block.

16. The tolerance method for the one-time programmable memory of claim 12, further comprising:
   when one of the variables is modified, determining, by the memory controller, whether the number of storage units which have been used has reached a second upper limit.

17. The tolerance method for the one-time programmable memory of claim 16, further comprising:
   if the number of storage units which have been used has not reached the second upper limit, determining, by the memory controller, whether the number of times the variable has been modified has reached a third upper limit.

18. The tolerance method for the one-time programmable memory of claim 17, further comprising:
   if the number of times the variable has been modified has not reached the third upper limit, according to the number of storage addresses which have been used, assigning, by the memory controller, the storage address which has not been used in the third block to the variable which is modified; and recording the storage address corresponding to the variable which is modified in the initial address unit corresponding to the variable which is modified in another initial-address-unit group.

19. The tolerance method for the one-time programmable memory of claim 18, further comprising:

when the variable is modified, increasing, by the memory controller, the number of storage units which have been used in the fifth block by 1 and increasing the number of times the variable has been modified in the second block by 1.

20. The tolerance method for the one-time programmable memory of claim 11, further comprising:

when the content of the variable programmed into the one-time programmable memory is read, reading, by the memory controller, the initial address control unit corresponding to the variable which is read to obtain the storage address stored in the initial address unit corresponding to the variable which is read; and according to the storage address corresponding to the variable which is read, reading, by the memory controller, the content of the variable which needs to be read.

* * * * *